United States Patent
Lu et al.

(10) Patent No.: US 10,738,182 B2
(45) Date of Patent: Aug. 11, 2020

(54) MOLDED ARTICLES AND METHODS THEREOF

(71) Applicant: Dow Global Technologies LLC, Midland, MI (US)

(72) Inventors: Keran Lu, Pearland, TX (US); Yijian Lin, Manvel, TX (US); Todd O. Pangburn, Midland, MI (US); Siddharth Ram Athreya, Freeport, TX (US); Laura Nunez, Freeport, TX (US); John L. Sugden, Saginaw, MI (US); Todd A. Hogan, Midland, MI (US); Andrew Heitsch, Angleton, TX (US); David T. Gillespie, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 1 day.

(21) Appl. No.: 15/959,679

(22) Filed: Apr. 23, 2018

(65) Prior Publication Data

US 2019/0322846 A1    Oct. 24, 2019

(51) Int. Cl.
| | |
|---|---|
| *B29C 45/00* | (2006.01) |
| *C08L 23/06* | (2006.01) |
| *C08L 23/08* | (2006.01) |
| *C08L 27/18* | (2006.01) |
| *B29K 23/00* | (2006.01) |
| *B29D 99/00* | (2010.01) |

(52) U.S. Cl.
CPC .......... *C08L 23/06* (2013.01); *B29C 45/0001* (2013.01); *C08L 23/0815* (2013.01); *C08L 27/18* (2013.01); *B29D 99/0096* (2013.01); *B29K 2023/065* (2013.01); *B29K 2023/08* (2013.01); *C08L 2207/062* (2013.01)

(58) Field of Classification Search
CPC .......... C08L 23/04; C08L 23/06; C08L 23/08; C08L 23/0807; C08L 23/0815; C08L 2207/062; B29C 45/0001; B29D 99/0096; B29K 2023/065; B29K 2023/08
See application file for complete search history.

(56) References Cited

U.S. PATENT DOCUMENTS

| | | |
|---|---|---|
| 4,100,105 A | 7/1978 | Levine et al. |
| 5,324,800 A | 6/1994 | Welborn, Jr. et al. |
| 6,022,933 A | 2/2000 | Wright et al. |
| 6,441,117 B1 † | 8/2002 | Cameron |
| 6,642,310 B2 † | 11/2003 | Chapman |
| 7,202,313 B2 | 4/2007 | Jorgensen et al. |
| 7,375,157 B2 * | 5/2008 | Amos ................. C08F 214/182 524/500 |
| 7,560,524 B2 † | 7/2009 | Michie |
| 7,714,072 B2 | 5/2010 | Michie, Jr. et al. |
| 8,920,891 B2 | 12/2014 | Michie, Jr. et al. |
| 9,587,093 B2 | 3/2017 | Aubee et al. |
| 9,597,860 B2 | 3/2017 | Zheng et al. |
| 2009/0068429 A1 | 3/2009 | Kmiec et al. |
| 2012/0160677 A1 † | 6/2012 | Feng |
| 2015/0087757 A1 | 3/2015 | Miley et al. |
| 2016/0168369 A1 * | 6/2016 | Sugden ............... C08L 23/0815 524/377 |
| 2017/0274574 A1 | 9/2017 | Borse et al. |

FOREIGN PATENT DOCUMENTS

| | | |
|---|---|---|
| WO | 2014091309 A2 | 6/2014 |
| WO | 2017112510 A1 | 6/2017 |

OTHER PUBLICATIONS

Balke, S.T. Et. Al., Chromatography Polymers, ACS Symposium Series Chapter 13, (1992).
Bernland, Karin and Smith, Paul. "Nucleating polymer crystallization with poly(tetrafluoroethylene) Nanofibrils", Journal of Applied Polymer Science vol. 114, Issue 1, pp. 281-287, Oct. 5, 2009.
Kratochvil, P., Fundamental Light-Scattering Methods, Classical Light Scattering from Polymer Solutions, 1987, pp. 113-144, Chapter 3.
Mourey, T. H. and Balke, S.T. Et. Al. Chromatography Polymers, ACS Symposium Series Chapter 12, (1992).
Zimm, B.H., Apparatus and Methods for Measurement and Interpretation of the Angular Variation of Light Scattering; Preliminary Results on Polystyrene Solutions, J. Chem. Phys., vol. 16 (12), 1099 (1948).

* cited by examiner
† cited by third party

*Primary Examiner* — Irina S Zemel
*Assistant Examiner* — Jeffrey S Lenihan

(57) ABSTRACT

A molded article formed from a polymer composition, the polymer composition consisting essentially of: an ethylene homopolymer or ethylene/alpha-olefin copolymer; greater than 20 ppm of a fluoropolymer; and optionally, up to 5 wt. % of one or more of processing aids, acid neutralizers, stabilizers, phosphites, antioxidants, metal de-activators, pigments or colorants, or fillers; wherein the molded article exhibits an oxygen transmission rate [OTR, $(cc*mm)/(m^2*day*atm)] \leq -3181$ $(cc^2*mm)/g*m^2*day*atm) \times $[Density, $g/cc$]+3077, $(cc*mm)/(m^2*day*atm)$.

6 Claims, 2 Drawing Sheets

MOLDED ARTICLES AND METHODS THEREOF

TECHNICAL FIELD

Embodiments of the present disclosure generally relate to molded articles, and more particularly to molded articles having enhanced barrier properties.

BACKGROUND

Polyethylene may be used in manufacturing molded articles, such as thin wall containers (e.g., lids and tubs), caps, closures, or fitments, to achieve adequate stiffness. However, the industry often desires to decrease the amount of material in molded articles to reduce the weight and lower shipping costs. Reducing the weight of molded articles is not without its drawbacks. A decrease in the barrier performance is often seen when reducing the weight of molded articles. Barrier performance of the molded article can affect the prevention of product spoilage. Even minimal reductions in the molded article's barrier to air, moisture and other contaminants can cause a dramatic impact on the shelf life of a product.

To combat these deficiencies, nucleating agents can be used. Typical nucleating agents may include one or more of metal carboxylates, metal aromatic carboxylate, hexahydrophthalic acid metal salts, stearates, organic phosphates, bisamides, sorbitols, and mixtures thereof. For example and not by way of limitation, suitable commercial examples of nucleating agents may include one or more of Hyperform® HPN-68L (which is primarily a disodium salt of bicyclo[2.2.1]heptane-2,3-dicarboxylic acid), Hyperform® HPN-20E (which is a mixture of zinc stearate and a calcium salt of 1,2-cyclohexanedicarboxylic acid), or Hyperform® HPN-600ei (which is primarily a disodium salt of bicyclo[2.2.1]heptane-2,3-dicarboxylic acid), or Hyperform® HPN-210M, which are available from Milliken Chemical (Spartanburg, S.C.).

However, these additives can be very expensive, difficult to disperse in polyethylene, and require greater amounts to provide suitable barrier performance, which can present a problem for food contact applications where compliance with government regulations is required.

Accordingly, it may be desirable to produce polyethylene compositions for use in manufacturing molded articles having improved barrier performance.

SUMMARY

Disclosed in embodiments herein are molded articles. The molded articles may be injection molded articles. The molded articles may further be injection molded caps, closures, fitments, or thin walled containers (e.g., lids and tubs). The molded article formed from a polymer composition, the polymer composition consisting essentially of: an ethylene homopolymer or ethylene/alpha-olefin copolymer, wherein the ethylene homopolymer or ethylene/alpha-olefin copolymer has a density of 0.920 g/cc to 0.968 g/cc, a melt index, I2, of greater than 7 g/10 min, and a molecular weight distribution curve (dWf/dlgM vs. lgM), as measured by gel permeation chromatography, has two inflection points; greater than 20 ppm of a fluoropolymer; and optionally, up to 5 wt. % of one or more of processing aids, acid neutralizers, stabilizers, phosphites, antioxidants, metal de-activators, pigments or colorants, or fillers; wherein the molded article exhibits an oxygen transmission rate [OTR, $(cc*mm)/(m^2*day*atm)$]$\leq$$-3181$ $(cc^2*mm)/(g*m^2*day*atm)\times$[Density, g/cc]$+3077$ $(cc*mm)/(m^2*day*atm)$.

Also disclosed in embodiments herein are molded articles. The molded articles may be injection molded articles. The molded articles may further be injection molded caps, closures, or fitments. The molded article formed from a polymer composition, the polymer composition consisting essentially of: an ethylene homopolymer or ethylene/alpha-olefin copolymer, wherein the ethylene homopolymer or ethylene/alpha-olefin copolymer has a density of 0.920 g/cc to 0.968 g/cc, a melt index, I2, of greater than 10 g/10 min, and a molecular weight distribution curve (dWf/dlgM vs. lgM), as measured by gel permeation chromatography, has more than two inflection points; greater than 20 ppm of a fluoropolymer; and optionally, up to 5 wt. % of one or more of processing aids, acid neutralizers, stabilizers, phosphites, antioxidants, metal de-activators, pigments or colorants, or fillers; wherein the molded article exhibits an oxygen transmission rate [OTR, $(cc*mm)/(m^2*day*atm)$]$\leq$$-3181$ $(cc^2*mm)/(g*m^2*day*atm)\times$[Density, g/cc]$+3077$ $(cc*mm)/(m^2*day*atm)$.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
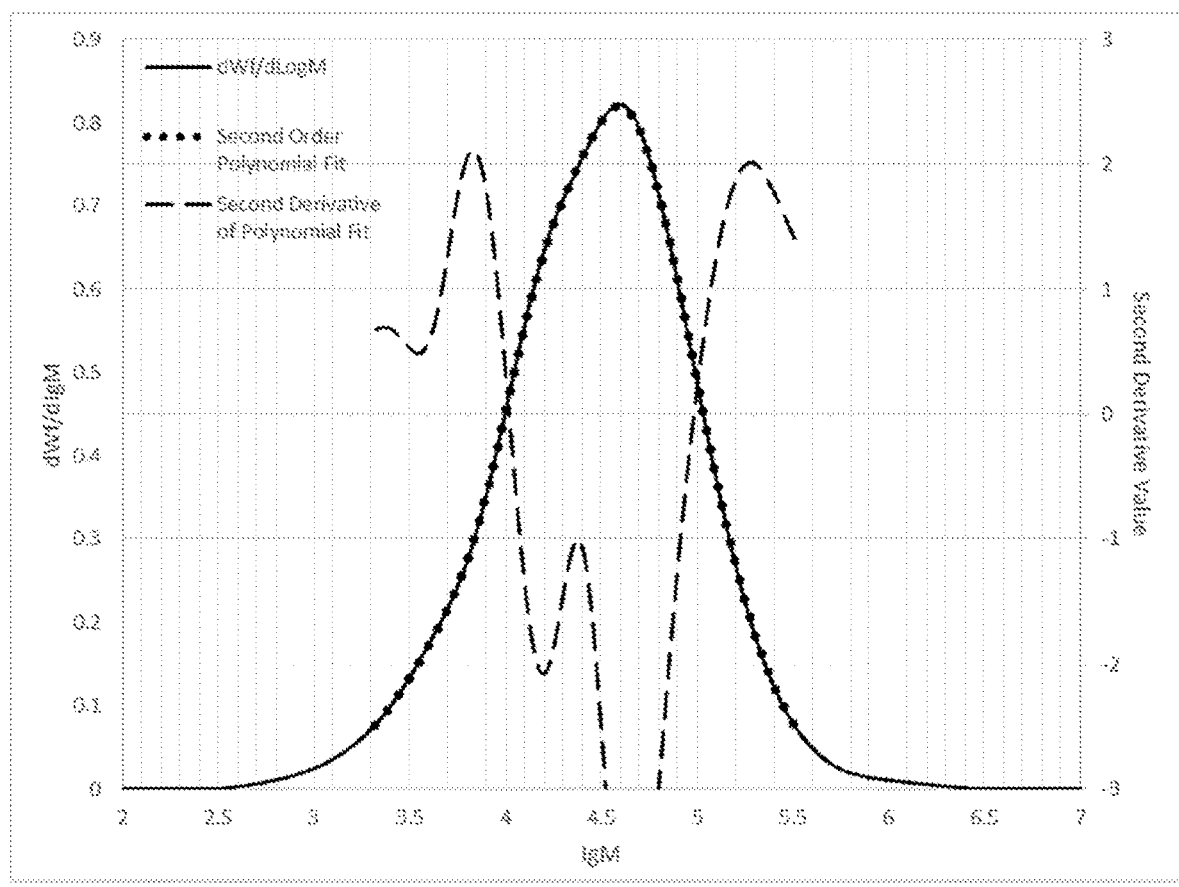
FIG. 1 graphically depicts the gel permeation chromatography curve (GPC) for Resin 1.

Reference will now be made in detail to embodiments of molded articles formed from a polymer composition as further described herein. The polymer compositions may be injection molded into articles used to form caps, closures, fitments, and thin walled containers (e.g., lids and tubs). It is noted, however, that this is merely an illustrative implementation of the embodiments described herein. The embodiments are applicable to other technologies that are susceptible to similar problems as those discussed above. For example, the molded articles described herein may be used in other applications, such as, articles formed by compression molding.

Polymer Composition

In some embodiments, the polymer composition consists essentially of or, in some embodiments, the polymer composition consists of, an ethylene homopolymer or ethylene/alpha-olefin copolymer, wherein the ethylene homopolymer or ethylene/alpha-olefin copolymer has a density of 0.920 g/cc to 0.968 g/cc, a melt index, I2, of greater than 7 g/10 min, and a molecular weight distribution curve (dWf/dlgM vs. lgM), as measured by gel permeation chromatography, has two inflection points. In other embodiments, the polymer composition consists essentially of or, in some embodiments, the polymer composition consists of an ethylene homopolymer or ethylene/alpha-olefin copolymer, wherein the ethylene homopolymer or ethylene/alpha-olefin copolymer has a density of 0.920 g/cc to 0.968 g/cc, a melt index, I2, of greater than 10 g/10 min, and a molecular weight distribution curve (dWf/dlgM vs. lgM), as measured by gel permeation chromatography, has more than two inflection points. In any of the embodiments herein, the amount of the polymer composition present in the molded article may be at least 75 wt. %, at least 80 wt. %, at least 85 wt. %, at least 90 wt. %, at least 95 wt. %, at least 97 wt. %, at least 99 wt. %, or 100 wt. %.

In any of the embodiments herein, "ethylene homopolymer" refers to a polymer that consists essentially of repeating units derived from ethylene. In some examples, an ethylene homopolymer contains at least 99 percent by weight of ethylene units, at least 99.5% by weight of ethylene units, at least 99.8% by weight of ethylene units, or at least 99.9% by weight of ethylene units. In any of the embodiments herein, "ethylene/alpha-olefin copolymer" refers to a polymer comprising repeating units derived from ethylene and one alpha-olefin comonomer. Suitable α-olefins may include those containing 3 to 20 carbon atoms (C3-C20). In some embodiments, the α-olefin may be a C4-C20 α-olefin, a C4-C12 α-olefin, a C3-C10 α-olefin, a C3-C8 α-olefin, a C4-C8 α-olefin, or a C6-C8 α-olefin. In some embodiments, α-olefins are selected from the group consisting of propylene, 1-butene, 1-pentene, 1-hexene, 4-methyl-1-pentene, 1-heptene, 1-octene, 1-nonene and 1-decene. In other embodiments, α-olefins are selected from the group consisting of propylene, 1-butene, 1-hexene, 4-methyl-1-pentene, and 1-octene. In further embodiments, α-olefins are selected from the group consisting of 4-methyl-1-pentene, 1-butene and 1-hexene.

In any of the embodiments herein, the density of the ethylene homopolymer or the ethylene/alpha-olefin copolymer is from 0.920 g/cc to 0.968 g/cc. All individual values and subranges of 0.920 to 0.968 g/cc are included and disclosed herein. For example, in some embodiments, the density of the ethylene/alpha-olefin copolymers is from 0.930 g/cc to 0.968 g/cc, 0.930 g/cc to 0.965 g/cc, or 0.930 g/cc to 0.960 g/cc. Densities disclosed herein for ethylene-based polymers are determined according to ASTM D-792.

In some embodiments, where the ethylene homopolymer or ethylene/alpha-olefin copolymer has a molecular weight distribution curve (dWf/dlgM vs. lgM), as measured by gel permeation chromatography, with two inflection points, the melt index, or I2, of the ethylene homopolymer or ethylene/alpha-olefin copolymer is greater than 7.0 g/10 min. All individual values and subranges of greater than 7.0 g/10 min are included and disclosed herein. For example, in some embodiments, the melt index, I2, of the ethylene homopolymer or ethylene/alpha-olefin copolymers is from 7 g/10 min to 200 g/10 min or 7 g/10 min to 175 g/10 min Melt index, or I2, for ethylene-based polymer components is determined according to ASTM D1238 at 190° C., 2.16 kg.

In other embodiments where the ethylene homopolymer or ethylene/alpha-olefin copolymer has a molecular weight distribution curve (dWf/dlgM vs. lgM), as measured by gel permeation chromatography, with more than two inflection points, the melt index, or I2, of the ethylene homopolymer or ethylene/alpha-olefin copolymer is greater than 10.0 g/10 min. All individual values and subranges of greater than 10.0 g/10 min are included and disclosed herein. For example, in some embodiments, the melt index, I2, of the ethylene homopolymer or ethylene/alpha-olefin copolymer is from 10 g/10 min to 200 g/10 min, from 10 g/10 min to 150 g/10 min, from 10 g/10 min to 100 g/10 min, from 10 g/10 min to 80 g/10 min, from 12 g/10 min to 80 g/10 min, or from 15 g/10 min to 80 g/10 min.

In addition to the density and melt index, or I2, in any of the embodiments herein (including those resins with two or more than two inflection points), the ethylene homopolymer or ethylene/alpha-olefin copolymers may have a $CDF_{IR}/CDF_{LS}$ ratio of greater than 2.0. All individual values and subranges of greater than 2.0 are included and disclosed herein. For example, in some embodiments, the ethylene homopolymer or the ethylene/alpha-olefin copolymers have a $CDF_{IR}/CDF_{LS}$ ratio of greater than 2.0 to 10, from 2.3 to 10, from 2.5 to 10, from 2.5 to 8.5, or from 2.5 to 7.5.

In addition to the density, melt index, or I2, and $CDF_{IR}/CDF_{LS}$ ratio in any of the embodiments herein (including those resins with two or more than two inflection points), the ethylene homopolymer or ethylene/alpha-olefin copolymers may have a molecular weight distribution (MWD) of less than 7.0. All individual values and subranges of less than 7.0 are included and disclosed herein. For example, in some embodiments, the ethylene homopolymer or the ethylene/alpha-olefin copolymers may have a molecular weight distribution (MWD) of less than 6.0 or 5.0. The MWD is the ratio of the weight average molecular weight (Mw) to the number average molecular weight (Mn) and can be shown as MWD or Mw/Mn. The molecular weights may be measured using GPC as further defined herein.

In embodiments herein, the ethylene homopolymers or ethylene/alpha-olefin copolymers having a molecular weight distribution curve (dWf/dlgM vs. lgM), as measured by gel permeation chromatography, with two inflection points may be polymerized using by a conventional single stage polymerization (single reactor) process, such as a solution, slurry, or gas-phase process, using a suitable catalyst such as a Ziegler-Natta catalyst, chrome catalyst, or a single site metallocene catalyst, as described, for example, in U.S. Pat. No. 5,324,800. In one particular embodiment, polymers having two inflection points are made according to the catalyst and process description in U.S. Pat. No. 7,560,524, which is herein incorporated by reference in its entirety. In another particular embodiment, the ethylene homopolymers or ethylene/alpha-olefin copolymers having two inflection points are made according to the catalyst and process description in WO2004/094489, U.S. Pat. Nos. 4,100,105, and 6,022,933, which are herein incorporated by reference. Examples of commercially available polymers having two inflection points include those sold under the tradenames DNDA-1082 NT 7, DMDA-8920 NT 7, DMDA-8940 NT 7, EVERCAP™ DMDC-1210 NT 7, and HDPE 10462N available from The Dow Chemical Company.

In embodiments herein, the ethylene homopolymers or ethylene/alpha-olefin copolymers having a molecular weight distribution curve (dWf/dlgM vs. lgM), as measured by gel permeation chromatography, with more than two inflection points may be produced using conventional polymerization processes, such as a solution, slurry, or gas-phase process, using a suitable catalyst such as a Ziegler-Natta or Phillips type catalyst or a single site metallocene catalyst. A non-limiting example of a method for making polymers having more than two inflection points is set forth in EP 2016128 (B1), EP2218751, U.S. Pat. No. 7,714,072, and U.S. 2009/0068429.

Fluoropolymer

In embodiments herein, the molded articles comprises greater than 20 ppm of a fluoropolymer. All individual values and subranges of greater than 20 ppm are included and disclosed herein. For example, in some embodiments, the molded article may comprise from 20 ppm to 5,000 ppm, 50 to 2,000 ppm of the fluoropolymer, or 50 to 1,000 ppm of the fluoropolymer.

In embodiments herein, the molded articles may comprise greater than 20 ppm of polytetrafluoroethylene. All individual values and subranges of greater than 20 ppm are included and disclosed herein. For example, in some embodiments, the molded article may comprise from 20 ppm to 5,000 ppm, 50 to 2,000 ppm of the fluoropolymer, or 50 to 1,000 ppm of the polytetrafluoroethylene.

Suitable fluoropolymers may include fluoropolymers that have a melting point above 240° C., above 250° C., above 300° C., above 310° C., or, in some instances, above 320° C. Examples may include, but are not limited to, fluorinated ethylene propylene, polyvinyl fluoride, perfluoroalkoxy alkane, polytetrafluoroethylene, or combinations thereof. In some embodiments, the fluoropolymer is selected from the group consisting of polytetrafluoroethylene, polyvinyl fluoride, or combinations thereof. In other embodiments, the fluoropolymer is polytetrafluoroethylene.

In embodiments herein, the polytetrafluoroethylene may have a melting point of from 320° C. to 334° C. All individual values and subranges of from 320° C. to 334° C. are included and disclosed herein. For example, in some embodiments, the polytetrafluoroethylene may have a melting point of from 322° C. to 332° C., or from 324° C. to 330° C. The melting point may be measured using differential scanning chromatography according to ASTM D3418.

In embodiments herein, the polytetrafluoroethylene may have an average particle size of from 1 micron to 100 microns. All individual values and subranges of from 1 micron to 100 micron are included and disclosed herein. For example, in some embodiments, the polytetrafluoroethylene has an average particle size of from 5 microns to 50 microns, from 5 microns to 25 microns, or from 5 microns to 15 microns. Average particle size may be determined according to optical or scanning electron microscopy.

In embodiments herein, the molded articles may contain one or more additives. Additives include, but are not limited to, processing aids, acid neutralizers, UV stabilizers, hydroperoxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, fatty acid stearates, fillers, and combinations thereof. The molded article may comprise from 0.001 to 10 wt. %, based on the weight of the polymer composition, of the one or more additives.

The polymer compositions described herein may be manufactured by any suitable mixing means known in the art, including melt or dry/physical blending of the individual components. It should be understood that other suitable methods for blending the components together may be utilized.

The molded articles described herein may be single-layer or multi-layer articles, which may be obtained by suitable known conversion techniques, applying heat, pressure, or a combination thereof, to obtain the desired article. Examples of suitable conversion techniques may include, for example, injection molding, compression molding.

In embodiments herein the molded article, injection molded article, cap, closure, fitment, or thin walled container may exhibit an oxygen transmission rate [OTR, (cc*mm)/(m$^2$*day*atm)]≤−3181 (cc$^2$*mm)/g*m$^2$*day*atm)×[Density, g/cc]+3077 (cc*mm)/(m$^2$*day*atm).

Test Methods

Unless otherwise stated, the following test methods are used. All test methods are current as of the filing date of this disclosure.

Density

Measurements are made according to ASTM D792, Method B. The result is recorded in grams per cubic centimeter (g/cc).

Melt Index

Melt index, $I_2$, for ethylene-based polymers is determined according to ASTM D1238 at 190° C., 2.16 kg and recorded in grams per 10 minutes (g/10 min).

Oxygen Transmission Rate

The oxygen transmission rate is measured on injection molded plaques according to ASTM D3985 with a MOCON OX-TRAN model 2/21 unit at 23° C., 1 atm, and 0% relative humidity.

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt.

Melting point, Tm, is determined from the peak temperature of the second DSC heating curve. Crystallization temperature, Tc, is determined from the peak temperature of the DSC cooling curve.

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene (TCB) and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQ 1)}$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.440) was made to correct for column resolution and band-broadening effects such that NIST standard NBS 1475 is obtained at 52,000 g/mol.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{RV_{Peak\ Max}}{\text{Peak Width at } \frac{1}{2} \text{ height}} \right)^2 \quad \text{(EQ 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(EQ 3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IRS detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad \text{(EQ 4)}$$

$$Mw_{(GPC)} = \frac{\sum_i (IR_i * M_{polyethylene_i})}{\sum_i IR_i} \quad \text{(EQ 5)}$$

$$Mz_{(GPC)} = \frac{\sum_i (IR_i * M_{polyethylene_i}^2)}{\sum_i (IR_i * M_{polyethylene_i})} \quad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

Flowrate(effective)=Flowrate(nominal)*(RV(FM Calibrated)/RV(FM Sample)) (EQ 7)

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IRS) and the light scattering constant (determined using GPCOne™) should be determined from a linear standard with a molecular weight in excess of about 50,000 g/mol.

Inflection Points on GPC Curves

The GPC data obtained from above with the IRS detector (based on polystyrene calibration curve) is shown as normalized weight fraction on the y-axis (dWf/dlgM) and the logarithm, base 10, of molecular weight (lgM) on the x-axis. The data is expressed as a series of 701 points equally spaced along the x-axis starting from lgM=2.00 and ending at lgM=9.00. The i-th data point (i=1 to 701) on the GPC plot has a molecular weight of $10^{(2.00+0.01 \times (i-1))}$ g/mol and a normalized weight fraction of $(dWf/dlgM)_i$. The GPC plot also follows the following normalization, $$\sum_{i=1}^{701} \left(\frac{dWf}{dlgM}\right)_i \times (lgM_{i+1} - lgM_i) = 100. \quad (EQ\ 8)$$

The $2^{nd}$ derivative at the i-th point with respect to lgM is defined for the range $21 \leq i \leq 681$ (or lgM in the range of 2.2 to 8.8) on the GPC plot is obtained using the following procedure.

1. A second-order polynomial curve $(A_{0,i}+A_{1,i}*lgM+A_{2,i}*(lgM)^2)$ is fit using the least-squares method across the consecutive 41 data points (from i−20 to i+20) centered at the i-th data point.

2. Calculate the $2^{nd}$ derivative of the fitted second-order polynomial curve at the point i, which is equal to $2*A_{2,i}$.

Figure 2:
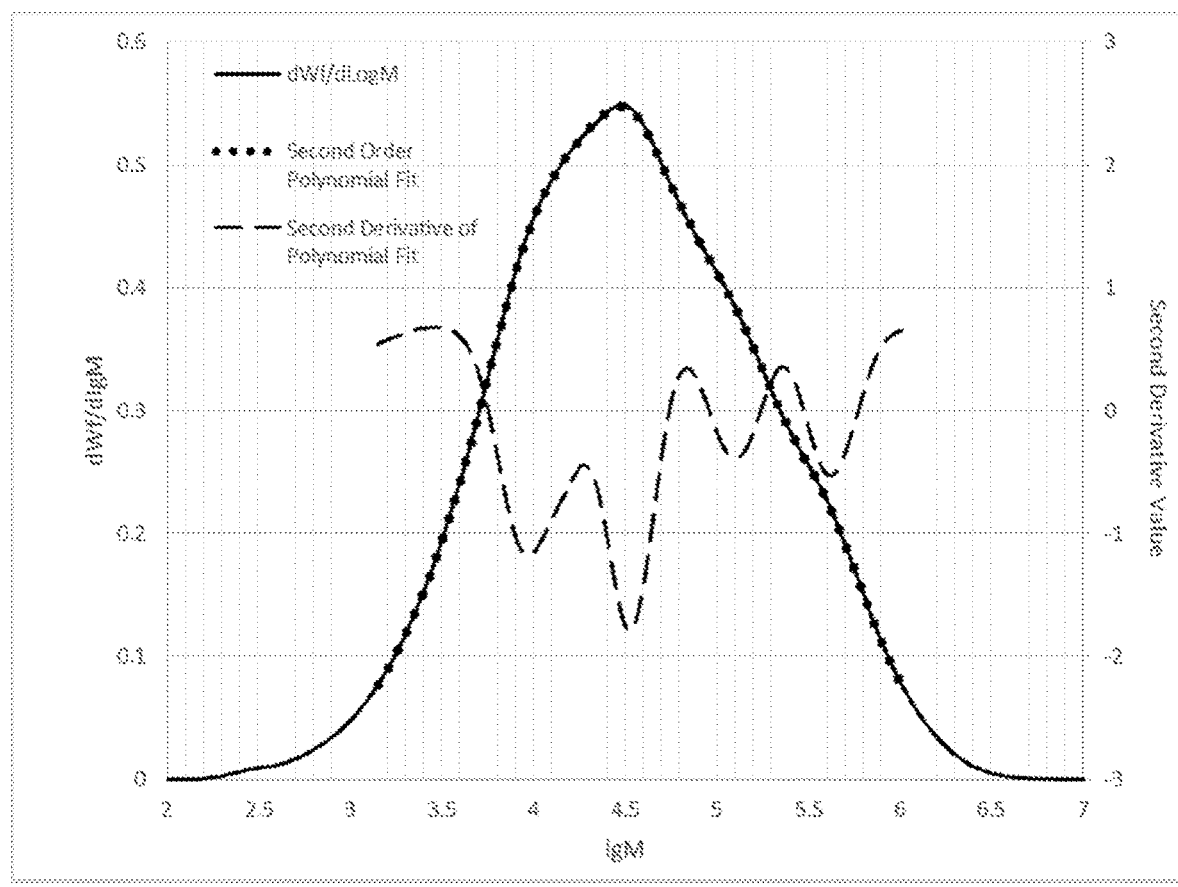
FIG. 2 graphically depicts the GPC curve for Comparative A.

The GPC plot and its $2^{nd}$ derivative curve of Resin 1 is shown in FIG. 1 and the GPC plot and its $2^{nd}$ derivative curve of Comparative A is shown in FIG. 2.

An inflection point occurs when two consecutive points of the second derivative as defined above changes in sign (e.g., from negative to positive or vice versa). The lgM value of the inflection point is defined as the average of the lgM values of the two consecutive points in between which the sign change occurred. Disqualify from consideration any point of inflection in which either of the corresponding (dWf/dlgM) value the two points defining the point of inflection is less than 0.075. Any two inflection points should have a lgM value difference greater than 0.1. Clusters of inflection points are defined as a group of points in which the lgM value of each point is within 0.1 of the lgM value of at least one other point in the cluster. Each cluster should only count as a single inflection point. As shown in FIG. 1, Resin 1 has two inflection points while Comparative A, as shown in FIG. 2, has 6 inflection points.

CDF Calculation Method

The calculation of the cumulative detector fractions for the IRS measurement detector and the low angle laser light scattering detector are accomplished by the following steps:

1) Linearly flow correct the chromatogram based on the relative retention volume ratio of the air peak between the sample and that of a consistent narrow standards cocktail mixture.

2) Correct the light scattering detector offset relative to the refractometer as described in the GPC section.

3) Calculate the molecular weights at each retention volume (RV) data slice based on the polystyrene calibration curve, modified by the polystyrene to polyethylene conversion factor of approximately (0.43) as described in the GPC section.

4) Subtract baselines from the light scattering and refractometer chromatograms and set integration windows using standard GPC practices making certain to integrate all of the low molecular weight retention volume range in the light scattering chromatogram that is observable from the refractometer chromatogram (thus setting the highest RV limit to the same index in each chromatogram). Do not include any material in the integration which corresponds to less than 150 MW in either chromatogram.

5) Calculate the CDF of the IRS Measurement sensor ($CDF_{IR}$) and LALLS chromatogram ($CDF_{LS}$) based on its baseline-subtracted peak height (H) from high to low molecular weight (low to high retention volume) at each data slice (j) according to Equations 9 and 10:

$$CDF_{IR} = \frac{\sum_{j=RV\ at\ 15,000\ MW}^{j=RV\ at\ Highest\ Integrated\ Volume} H_j}{\sum_{j=RV\ at\ Lowest\ Integated\ Volume}^{j=RV\ at\ Highest\ Integrated\ Volume} H_j} \quad (EQ\ 9)$$

$$CDF_{LS} = \frac{\sum_{j=RV\ at\ Lowest\ Integrated\ Volume}^{j=RV\ at\ 1,000,000\ MW} H_j}{\sum_{j=RV\ at\ Lowest\ Integated\ Volume}^{j=RV\ at\ Highest\ Integrated\ Volume} H_j} \quad (EQ\ 10)$$

EXAMPLES

The embodiments described herein may be further illustrated by the following non-limiting examples. Resin 1 is an ethylene/alpha-olefin copolymer having a molecular weight distribution curve (dWf/dlgM vs. lgM), as measured by gel permeation chromatography, that has two inflection points, and is available as DMDA-8920 NT 7 from The Dow Chemical Company (Midland, Mich.). Resin 2 is an ethylene/alpha-olefin copolymer having a molecular weight distribution curve (dWf/dlgM vs. lgM), as measured by gel permeation chromatography, that has two inflection points, and is available as DNDA-1082 NT 7 from The Dow Chemical Company (Midland, Mich.). Comparative A is an ethylene/alpha-olefin copolymer having a molecular weight distribution curve (dWf/dlgM vs. lgM), as measured by gel permeation chromatography, that has more than two inflection points, and is available as CONTINUUM™ DMDC-1250 NT 7 from The Dow Chemical Company (Midland, Mich.). Comparative B is an ethylene/alpha-olefin copolymer having a molecular weight distribution curve (dWf/dlgM vs. lgM), as measured by gel permeation chromatography, that has more than two inflection points, and is available as CONTINUUM™ DMDD-6620 NT 7 from The Dow Chemical Company (Midland, Mich.). Additional properties can be found in Tables 1A & 1B.

TABLE 1A

Inventive & Comparative Resin Properties

| | Density (g/cc) | Melt Index, $I_2$ (g/10 min) | DSC Tm (° C.) | DSC Tc (° C.) | GPC $M_{n(GPC)}$ (g/mol) | GPC $M_{w(GPC)}$ (g/mol) | GPC $M_{z(GPC)}$ (g/mol) | $M_{w(GPC)}/M_{n(GPC)}$ |
|---|---|---|---|---|---|---|---|---|
| Resin 1 | 0.954 | 20 | 128.9 | 116.4 | 12350 | 54289 | 207044 | 4.4 |
| Resin 2 | 0.933 | 165 | 126.7 | 112.6 | 7727 | 31084 | 113409 | 4.0 |
| Comparative A | 0.955 | 1.5 | 129.3 | 117.7 | 9766 | 122102 | 683970 | 12.5 |
| Comparative B | 0.958 | 0.3 | 131.7 | 119.1 | 11125 | 189158 | 1073475 | 17.0 |

TABLE 1B

Inventive & Comparative Resin Properties

| | $CDF_{IR}$ | $CDF_{IR}/CDF_{LS}$ |
|---|---|---|
| Resin 1 | 0.269 | 2.6 |
| Resin 2 | 0.455 | 7.4 |
| Comparative A | 0.325 | 1.06 |
| Comparative B | 0.284 | 0.74 |

Inventive & Comparative Compositions

The inventive and comparative compositions, as described below in Table 4, are prepared using each resin mixed with varying amounts of polytetrafluoroethylene (available from Scientific Polymer Products, Inc.) have an average particle size 10 μm in a 30 mm co-rotating, intermeshing Coperion Werner-Pfleiderer ZSK-30 twin screw extruder and then pelletized for the subsequent injection molding process. The ZSK-30 has ten barrel sections with an overall length of 960 mm and an L/D ratio of 32. The temperature is set at 80° C. (zone 1—feed), 160° C. (zone 2), 180° C. (zone 3), 185° C. (zone 4), 195° C. (zone 5), and 235° C. (die).

The compositions made containing Resin 2 and Comparative resins A & B are injection molded into plaques. The plaques are 4 inches×6 inches×60 mils in dimension and injection molded using the conditions provided below in Table 2. The compositions made containing Resin 1 are 25 mil thick injection molded lids that are 6 inches in diameter. The lids are prepared using the conditions provided below in Table 3.

TABLE 2

Injection Molding Process Conditions (60 mil Plaques)

| Barrel Temperature (Zone 1, 2, 3, 4, Nozzle) | ° F. | 400 flat profile |
|---|---|---|
| Mold Temperature | ° F. | 90 |
| Hold Time | sec | 15 |
| Hold Pressure | psi | 6500 |
| Cooling Time | sec | 22 |
| Back Pressure | psi | 650 |
| Fill Time | sec | 1.18 |
| Screw Speed | rpm | 75 |
| Injection Speed | cc/s | 35 |
| Suck Back (decompression) | cc | .8 |
| Cycle Time | sec | 44 |
| Machine | | Toyo Si-110 III |

TABLE 3

Injection Molding Process Conditions (25 mil Lids)

| Conditions | | |
|---|---|---|
| Fill time | sec | 0.09 |
| Total Cycle time | sec | 10.78 |
| Hold time | sec | 5 |
| Cooling time | sec | 2 |
| Hold pressure | psi | 841 |
| Injection pressure | psi | 903 |
| Transfer position | mm | 26 |
| Fill Speed | mm/sec | 500 |
| Shot size | Mm | 40 |
| Melt temperature | ° F. | 489 |
| Oil temperature | ° F. | 109 |
| Hot runner temp. | ° F. | 421 |
| Mold cooling temp. | ° F. | 65 |
| Hydraulic Pressure | psi | 1550-1610 |
| Intensification Ratio | Ratio | 10x |
| Machine | | Husky Model: LX225RS50 |

The sample plaques have a thickness as shown below in Table 4. Table 4 also provides test results for the oxygen transmission rates of the inventive and comparative compositions.

TABLE 4

Compositions

| Example | Description | Part Thickness (mil) | OTR cc*mm/(m²*day) |
|---|---|---|---|
| C1 | Resin 1 | 60 | 53.2 |
| I1-A | Resin 1 with 75 ppm PTFE | 60 | 38.7 |
| I1-B | Resin 1 with 1000 ppm PTFE | 60 | 36.4 |
| C2 | Resin 2 | 25 | 136.7 |
| I2 | Resin 2 with 1000 ppm PTFE | 25 | 76.3 |
| C3-A | Comparative A | 60 | 50.0 |
| C3-B | Comparative A with 75 ppm PTFE | 60 | 47.5 |
| C3-C | Comparative A with 1000 ppm PTFE | 60 | 46.7 |
| C4-A | Comparative B | 60 | 60.4 |
| C4-B | Comparative B with 75 ppm PTFE | 60 | 68.0 |
| C4-C | Comparative B with 1000 ppm PTFE | 60 | 74.1 |

The results show that the inventive compositions have improved barrier properties than those fabricated from the corresponding comparative compositions without PTFE nucleator. C1 has worse barrier performance than I1-A and I1-B. C2 has worse barrier performance than I2. Comparative samples C3A-C and C4A-C demonstrate that addition of PTFE does not enhance barrier performance at lower melt index resins. Example C3-A, without PTFE, has similar barrier performance compared to example C3-B and C3-C, which have PTFE. Similarly, Example C4-A, without PTFE, actually has better barrier performance than examples C4-B and C4-C, which have PTFE.

In addition, all the inventive samples exhibit an oxygen transmission rate [OTR, (cc*mm)/(m$^2$*day*atm)]≤−3181 (cc$^2$*mm)/(g*m$^2$*day*atm)×[Density, g/cc]+3077 (cc*mm)/(m$^2$*day*atm).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. An injection molded article formed from a polymer composition, the polymer composition consisting essentially of:
   an ethylene homopolymer or ethylene/alpha-olefin copolymer, wherein the ethylene homopolymer or ethylene/alpha-olefin copolymer has a density of 0.920 g/cc to 0.968 g/cc, a melt index, I2, of from greater than 7 g/10 min to 22 g/10 min, a molecular weight distribution curve (dWf/dlgM vs. lgM), as measured by gel permeation chromatography, has two inflection points, and a $CDF_{IR}/CDF_{LS}$ ratio of greater than 2.0;
   greater than 20 ppm of polytetrafluoroethylene having a melting point of above 300° C. and an average particle size of from 1 micron to 100 microns; and
   optionally, up to 5 wt. % of one or more of processing aids, acid neutralizers, stabilizers, phosphites, antioxidants, metal de-activators, pigments or colorants, or fillers;
   wherein the molded article exhibits an oxygen transmission rate [OTR, (cc*mm)/(m2*day*atm)]≤−3181 (cc2*mm)/(g*m2*day*atm)×[Density, g/cc]+3077 (cc*mm)/(m2*day*atm).

2. The molded article of claim 1, wherein the ethylene homopolymer or ethylene/alpha-olefin copolymer has a density from 0.930 g/cc to 0.968 g/cc.

3. The molded article of claim 1, wherein the ethylene homopolymer or ethylene/alpha-olefin copolymer has a melt index (I2) from 12 g/10 min to 200 g/10 min.

4. The molded article of claim 1, wherein the ethylene homopolymer or ethylene/alpha-olefin copolymer has a molecular weight distribution (MWD) of less than 7.0, wherein the molecular weight distribution is the ratio of the weight average molecular weight (Mw) to the number average molecular weight (Mn), as measured by gel permeation chromatography.

5. The molded article of claim 1, wherein the molded article comprises from 50 to 2,000 ppm of fluoropolymer.

6. The molded article of claim 1, wherein the injection molded article is a thin wall container, cap, closure, or fitment.

* * * * *